US008374834B2

(12) United States Patent
Bailey et al.

(10) Patent No.: US 8,374,834 B2
(45) Date of Patent: Feb. 12, 2013

(54) STATISTICAL METHOD FOR ANALYZING THE PERFORMANCE OF OILFIELD EQUIPMENT

(75) Inventors: William J. Bailey, Danbury, CT (US); Benoit Couet, Weston, CT (US); James R. Hogan, Bartlesville, OK (US); Iain S. Weir, Axbridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 146 days.

(21) Appl. No.: 12/859,962

(22) Filed: Aug. 20, 2010

(65) Prior Publication Data

US 2011/0004454 A1    Jan. 6, 2011

Related U.S. Application Data

(63) Continuation of application No. 11/461,911, filed on Aug. 2, 2006, now Pat. No. 7,801,707.

(51) Int. Cl.
*G06G 7/48* (2006.01)
(52) U.S. Cl. ........... 703/6; 703/10; 340/648; 340/854.6; 340/604; 175/57; 175/61; 166/265; 166/357; 166/250.01; 166/313; 310/87; 73/705
(58) Field of Classification Search ............ 703/10, 703/15, 17, 5; 706/23; 340/548, 648, 854.6, 340/604; 175/57, 61; 166/265, 357, 250.01, 166/313; 310/87; 73/705
See application file for complete search history.

(56) References Cited

U.S. PATENT DOCUMENTS

| | | | | |
|---|---|---|---|---|
| 6,223,143 B1 * | 4/2001 | Weinstock et al. | ............. | 703/17 |
| 7,099,852 B2 * | 8/2006 | Unsworth et al. | ............. | 706/23 |
| 2004/0006453 A1 * | 1/2004 | Gluhovsky et al. | ............. | 703/15 |
| 2004/0030667 A1 * | 2/2004 | Xu et al. | ............. | 707/1 |
| 2007/0252717 A1 * | 11/2007 | Fielder | ............. | 340/648 |

OTHER PUBLICATIONS

Nader Ebrahimi Indirect Assessment of System Reliability IEEE Transactions on Reliability vol. 2, No. 1, Mar. 2003.*
John Klein Small sample moments of some extimators of the variance of the Kaplan-Meier and Nelson-Aalen estimators Scandinavian Journal of Statistics, 1991.*
Lukman et al. Advantage of the Modified Lunn-Mcneil technique over Kalbfleisch-Prentice technique in competing risks SPIE vol. 4730, 2002.*
Tyler Smith, Besa Smith, Margaret Ryan Survival Analysis Using Cox Proportional Hazards Modeling for Single and Multiple Event Time Data Proceeding of the 28th annual SAS users group international conference, SAS Institute, Inc. 2003.*

* cited by examiner

*Primary Examiner* — David Silver
*Assistant Examiner* — Cuong Luu
(74) *Attorney, Agent, or Firm* — Jim Patterson (57) ABSTRACT

A statistical methodology is disclosed to provide time-to-event estimates for oilfield equipment. A method according to the present invention extracts unbiased information from equipment performance data and considers parameters interactions without recourse to data thinning. The analysis explicitly accounts for items of equipment that are still operational at the time of analysis. A method according to the present invention may also be utilized to apply survival analysis to any oilfield equipment components where time-to-event information has been recorded. The method of the present invention allows comparative reckoning between different components present in the system comprising several or many individual components and allows analysis of these components either individually or simultaneously, i.e., in the presence of other components.

14 Claims, 5 Drawing Sheets

FIG. 5

STATISTICAL METHOD FOR ANALYZING THE PERFORMANCE OF OILFIELD EQUIPMENT

CROSS REFERENCE TO RELATED APPLICATION

This application is a continuation of U.S. application Ser. No. 11/461,911 filed Aug. 2, 2006, which is pending.

BACKGROUND OF THE INVENTION

1. Field of the Invention

The present invention generally relates to a statistical method which provides time-to-event estimates for oilfield equipment, and, more particularly a method which utilizes survival analysis techniques for analyzing time-to-event data.

2. Description of the Prior Art

Currently oilfield tool (and equipment) performance prediction and analysis is conducted in an ad hoc fashion with varying degrees of sophistication and quality of interpretation. A major concern is that of bias being introduced into the analysis and hence into the results, either through the exclusion of data or by assumptions about the performance of equipment at the time of data sampling. At the time of an analysis, the analyst has a population of capital intensive oilfield equipment from which to draw data. Some of this equipment may have already failed at the time of the data was extracted, while other installed equipment is still fully operational and had not failed at the time the data was extracted. This latter subset of the population has been the subject of improper analysis in the past in two particulars: (i) complete exclusion of the data set; or (ii) the inaccurate assumption that, at the time the data was drawn, the equipment had failed.

Survival analysis is a statistical methodology and testing hypothesis of time-to-event data that has, for example, been applied in the medical field to analyze time-to-death of a patient after surgery, the cessation of smoking, the reoccurrence of disease. For most statistical applications, models for probability distributions are usually described in terms of:

Probability Density Function (pdf) f(t): a function whose integral over a given range is equal to the probability of taking a value in that range.

Distribution Function F(t) (cumulative density function): the probability of the event occurring by time t.

For survival analysis, however, it is appropriate to work with different functions characterizing the distribution:

Survival Function S(t): the probability of surviving at least to time t [sometimes known as a reverse cumulative density function: $1-F(t)$].

Hazard Function h(t): the potential of failure in the next instant given survival to time t.

An Explanatory Variable (EV) is a variable that may influence equipment behavior. In conventional product-limit analysis, the investigation of a single EV requires partitioning of data set into subsets for each level of the EV and analysis is then performed independently on each subset. This has the effect of thinning the data which may result in less reliable statistics. In an investigation of two or more EVs, this problem is compounded. For example, if it is desired to predicate how an Electrical Submersible Pump (ESP) System would behave in a deviated well (true/false) and an openhole well (true/false), four data subsets exist to examine independently. As the number of EVs in an analysis is increased, there will be some subsets that are sparsely populated.

SUMMARY OF THE INVENTION

A rigorous statistical methodology has been developed to provide time-to-event (e.g., failure) estimates for of oilfield equipment. This technique extracts unbiased information from equipment performance data and can consider parameter interactions without recourse to data thinning. The analysis explicitly accounts for items of equipment that are still operational at the time of the analysis, thus removing a significant source of bias in the results.

When the collection of the data on the equipment to be analyzed is made, certain items of the equipment have yet to fail. To ensure that the full population of equipment and tools is fully considered without any bias entering into the analysis, a method in accordance with the present invention comprises the step of assigning a censoring flag (e.g., 0=failure, 1=censored) to the equipment, e.g., an ESP. This step of assigning a censoring flag is a distinguishing feature of the present invention and permits the application of a tried and tested statistical survival analysis to the data. For oilfield equipment, survival analysis is effectively the only reasonable, bias-free and consistent approach to a performance analysis.

The first stage of a method according to the present invention comprises Exploratory Data Analysis (EDA). This first stage comprises the utilization of both Cox Proportional Hazard (CPH) and Kaplan-Meier (KM) modeling approaches to allow the user to become acquainted with the data and to recognize anomalies and outliers. The primary purpose of EDA is to obtain a reasonable initial model for the stepwise model selection procedure (Stage 2). This initial model is realized through the application of various statistical tests that identify significant Explanatory Variables (EVs) when considered singularly. The tests may, for example, be log-rank or Peto tests for KM and likelihood ratio test (LRT) for CPH. A process according to the present invention may further comprise the application of a CPH-related test to consider the assumption of proportional hazards used in the CPH model. EDA may also identify potential candidates for later transformation and grouping.

The second step in a method according to the present invention comprises Stepwise Model Selection. In one embodiment, a stepwise model selection is applied using the Akaike Information Criteria (AIC). All possible combinations of the EVs that were found to be significant in the EDA stage are the range of models examined in the stepwise search. The initial model is the most complex from this range, i.e., that which includes all of these EVs. A result of this second stage is a model that has identified the significant parameters in combination as opposed only identifying significant EVs individually.

The third step in a method according to the present invention is Factor Collapsing. In this step, the number of levels of a factor is economized, e.g. by using a backward elimination process using LRTs. The process iteratively considers the candidate models formed by all possible pair-wise joining of factor levels within the EVs in the current model. The least significant amalgamation is accepted for the current model of the next iteration. If all possible collapses have significant p-values, then the process is stopped.

The fourth step in a method in accordance with the present invention comprises the inclusion of interactions/other EVs. In this stage, consideration is given to model refinement by applying stepwise model selection using AIC from the current model. The range of models is bounded by the most complex that includes the current EVs, their pair-wise interactions and the excluded EVs, not just those identified in Stage 1. The inclusion of previously disqualified EVs allows the confirmation that they are indeed not necessary. The inclusion of pair-wise interaction parameters allows the capture of EV effects that are not behaving in an additive way. In other words, interactions allow an EV to have a different influence on survival over the different values provided by considering another EV.

The fifth step of a process according to the present invention is Model Checking where the proportional hazard assumption of the final model is tested. A global test is employed to see, if overall, the model violates this assumption. If it does, then proportional hazard assumption tests for individual EVs can suggest which of them violate the assumption. Any such variable needs to be declared as a strata variable in a stratified CPH model. Here separate baseline functions are fitted for the levels of each violating EV.

A method according to the present invention may also be utilized to apply survival analysis to any oilfield equipment components where time-to-event information has been recorded. The method of the present invention allows comparative reckoning between different components present in the system comprising several, or many, individual components, and allows analysis of these components either individually or simultaneously (in the presence of other components).

A method of performing a survival analysis on the components of an item of equipment comprises the step of representing the data on said components in a counting process formulation of a Cox Proportional hazards model. A method of the present invention next comprises the step of applying an extension of the Cox Proportional Hazard model to the data, and in one embodiment, the extension which is applied is as described in Lunn, M. and McNeil, D., "Applying Cox Regression to Competing Risks," Biometrics (June 1995) [hereafter "Lunn extension"]. A method according to the present invention next comprises the step of performing individual survival analysis on each of the identified components by using the five-stage method described above. The final step of a method according to the present invention is to establish the time-to-event estimate for each of the recorded components, either taken individually or in the presence of the other components, such that an estimate of competing risks is obtained.

DESCRIPTION OF SPECIFIC EMBODIMENTS

It will be appreciated that the present invention may take many forms and embodiments. In the following description, some embodiments of the invention are described and numerous details are set forth to provide an understanding of the present invention. Those skilled in the art will appreciate, however, that the present invention may be practiced without those details and that numerous variations and modifications from the described embodiments may be possible. The following description is thus intended to illustrate and not to limit the present invention.

A method in accordance with the present invention is described with respect to an Electrical Submersible Pump (ESP) system comprising 117 separate records for ESPs either currently or previously installed. Those skilled in the art will also appreciate that a method according to the present invention is not limited in its application to ESP systems, but rather may be applied to numerous types of oilfield equipment systems where any specific time-to-event understanding is desirable from both an operational assurance and financial standpoint. This is typically the case for equipment in place for extended periods of time, like ESPs, valves, permanent gauges, etc.

A method in accordance with the present invention utilizes a standard statistical software package. Several such packages are commercially available. In one embodiment, the R statistical software package is utilized in the method of the present invention.

I. DEFINITIONS

As used in this specification and in the appended claims:

1. The term "Explanatory Variable" (EV) means a variable that may influence equipment behavior. An EV may be a "factor" which is a categorized variable such as the type of equipment or a "covariate" which is a numerical variable.

2. The term "parsimony" means "praiseworthy economy in use of means to an end; avoidance of excess." The term "parsimonious" is used to describe a model which has parsimony.

II. DESCRIPTION OF A METHOD OF SURVIVAL ANALYSIS FOR OILFIELD EQUIPMENT SYSTEMS

A method according to the present invention may be applied to a set of data, e.g. EVs, that has been compiled or collected on the equipment to be analyzed. Since certain items of equipment had not yet failed at the time of data collection, a method according to the present invention assigns a censoring flag to each such item of equipment. For example, this censoring flag may equal "0" if the equipment has failed and "1" if the equipment is censored.

A basic data check is then undertaken to ensure compatibility in the analysis and to prevent system software and algorithmic failure and crash due, for example, to divisions by zero or an unrealizable numbers of permutations plus, spurious data, inconsistent data (i.e. characters where numerical values were expected, etc.). This basic data check involves checking for and discarding any EVs that are factors with low counts and the threshold delineating low counts can be set and changed by the user. In one embodiment, if a level has three or less members, then it is tagged accordingly. Such variables do not contain contrasting information that would allow for a variable effect to be estimated, and therefore, should be excluded from the analysis as separate levels; rather, they are gathered together into a new composite level terms "Other".

The method of the present invention was applied to data collected from a system of ESPs from fields in Ecuador, South America operated by a single major operating company. This data was selected for demonstration due to its tractable size (small enough to enable testing and debugging) yet rich enough to demonstrate all the necessary concepts. Furthermore the data was "good" i.e. no data-holes or quality issues. Each ESP initially had 64 EVs associated with it. Table I below is a list of the final 57 EVs considered in the ESP analysis from the original 64 EVs associated with each ESP. The 57 were identified from a preliminary analysis of the data where perfectly correlated EV's were removed e.g. sysmanf and cabmanf were exactly the same, EV's with only 1 level were removed and also EVs with simply too many low-count (<=3) unique levels (i.e. well names) would result in just one level called "Other". For the survival analysis that was applied to an ESP system, the lower part of Table I shows that eight EVs were removed from the main analysis for the reasons indicated in the preceding paragraph. Furthermore low-count data entries were grouped together into a composite class called "other" and are used in the analysis. These are distinct from zero-count entries, which are marked by "N/A", and are not used.

TABLE I

| Index | Explanatory Variable | Type | Levels |
|---|---|---|---|
| 1 | Field ID | Factor | 7 |
| 2 | Well ID | Factor | 12 |
| 3 | Event ID | Covariate | N/A |
| 4 | Application | Factor | 2 |
| 5 | Deviated Well | Factor | 2 (T/F) |
| 6 | Open Hole | Factor | 2 (T/F) |
| 7 | Casing ID | Factor | 3 |
| 8 | Corrosion observed | Factor | 2 (T/F) |
| 9 | Scale build-up in well | Factor | 2 (T/F) |
| 10 | Abrasion observed | Factor | 2 (T/F) |
| 11 | Application Engineer | Factor | 6 |
| 12 | Field Technician | Factor | 8 |
| 13 | Spooler Operator | Factor | 6 |
| 14 | Rig | Factor | 9 |
| 15 | Panel Type | Factor | 8 |
| 16 | Panel Manufacturer | Factor | 2 |
| 17 | Variable Speed Drive | Factor | 3 |
| 18 | Depth of ESP | Covariate | N/A |
| 19 | System Manufacturer | Factor | 2 |
| 20 | Pump Manufacturer | Factor | 2 |
| 21 | Pump Series | Factor | 5 |
| 22 | Pump Type | Factor | 10 |
| 23 | Pump Stages | Covariate | N/A |
| 24 | Number of Pumps | Covariate | N/A |
| 25 | Intake Manufacturer | Factor | 3 |
| 26 | Intake Serial | Factor | 4 |
| 27 | Intake Type | Factor | 6 |
| 28 | Protector Manufacturer | Factor | 2 |
| 29 | Protector Serial | Factor | 4 |
| 30 | Protector Type | Factor | 11 |
| 31 | Number of Protectors | Covariate | N/A |
| 32 | Motor Manufacturer | Factor | 2 |
| 33 | Motor Series | Factor | 5 |
| 34 | Number of Motors | Covariate | N/A |
| 35 | Motor Horsepower | Covariate | N/A |
| 36 | Motor Voltage | Covariate | N/A |
| 37 | Motor Amperage | Covariate | N/A |
| 38 | Pressure Instr. Manuf. | Factor | 2 |
| 39 | Cable Manufacturer | Factor | 3 |
| 40 | Cable Type | Factor | 6 |
| 41 | Actreas | Factor | 7 |
| 42 | Tubing ID | Factor | 4 |
| 43 | Tubing Type | Factor | 5 |
| 44 | Motor Controller Type | Factor | 4 |
| 45 | Wellhead ID | Factor | 8 |
| 46 | J-Box present | Factor | 2 (T/F) |
| 47 | Meter Lead | Factor | 5 |
| 48 | Check Valve present | Factor | 2 (T/F) |
| 49 | Bleeder Valve present | Factor | 2 (T/F) |
| 50 | UMB present | Factor | 2 (T/F) |
| 51 | Adaptor present | Factor | 2 (T/F) |
| 52 | Y-Tool present | Factor | 2 (T/F) |
| 53 | Centralizer present | Factor | 2 (T/F) |
| 54 | Cable Protector present | Factor | 2 (T/F) |
| 55 | Cable Band | Factor | 3 |
| 56 | Phasing | Factor | 2 (T/F) |
| 57 | Grounded | Factor | 2 (T/F) |
| | | Removed due to | |
| 58 | Packer present | Low count | |
| 59 | Shroud Present | Low count | |
| 60 | TVSS installed | Low count | |
| 61 | Number of Intakes | Related to EV #34 | |
| 62 | Number of pump sections | Related to EV #24 | |
| 63 | Operator ID | Related to EV #11 | |
| 64 | Client ID | 1 level only | |

The first stage of a method according to the present invention comprises Exploratory Data Analysis of each EV that was not excluded from the analysis as a result of the basic data check. In this first stage, both KM and CPH for all non-excluded EVs are generated and considered.

Figure 1:
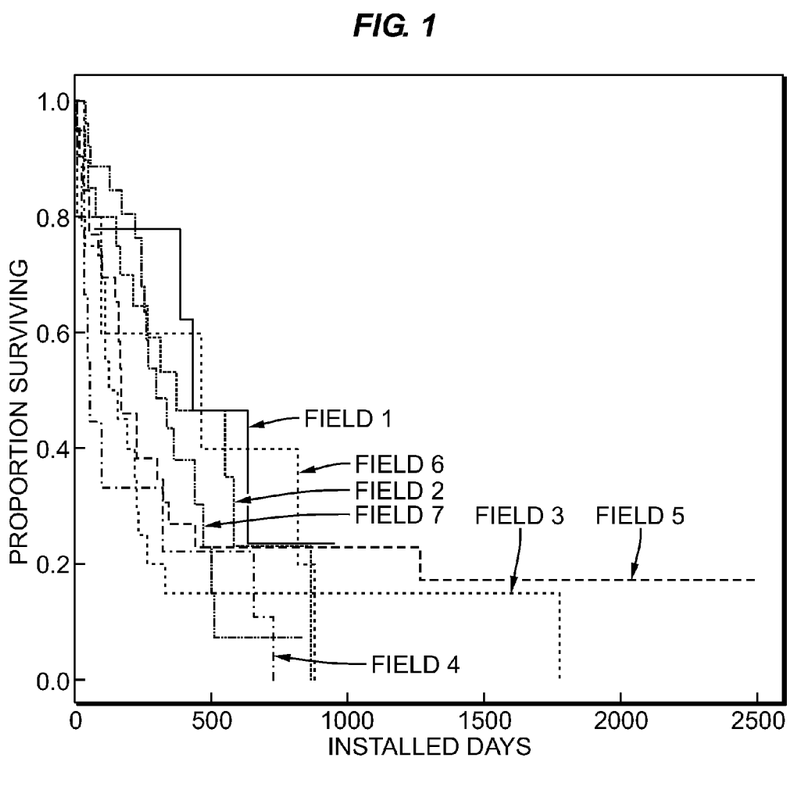
FIG. 1 is a graph that illustrates the Kaplan-Meier curves after Stage 1 of the method of the present invention as being applied for the Explanatory Variable [EV] "FieldID" (the name of the EV denoting the hydrocarbon producing field and is a unique identifier) in a subject data set pertaining to an ESP System.
Figure 2:
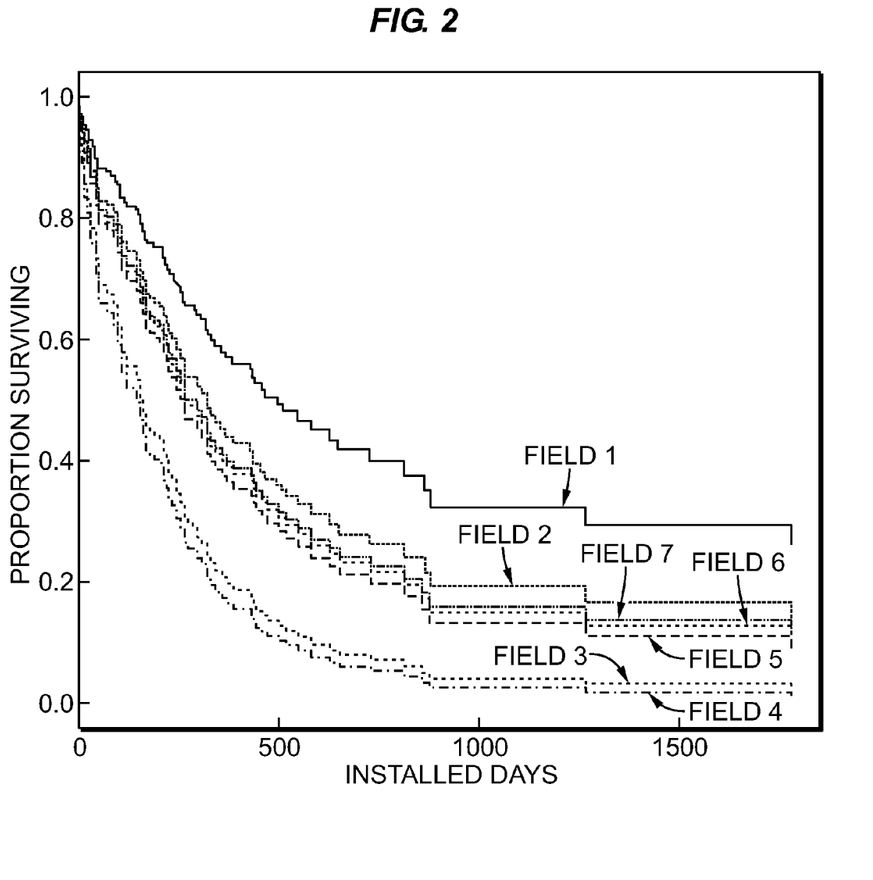
FIG. 2 is a graph that illustrates the Cox Proportional Hazard curves for the same "Field ID" data used in FIG. 1.

The resultant statistic of only one single EV (namely FieldID from the ESP study) is illustrated for demonstrative purposes. The EV FieldID had seven levels (i.e., there were seven separate producing fields). FIG. 1 illustrates the statistical curves for the EV FieldID for the test ESP System, while FIG. 2 illustrates the CPH curves for the same data as used in FIG. 1. Table II below presents the summary statistics of the KM analysis for this variable. Table III presents the same FieldID statistical data as Table II using the CPH model instead of KM.

TABLE II

KM summary statistics for explanatory variable FieldID for seven fields in the ESP System (117 records with 2 NAs).

| Kaplan-Meier FieldID | n | Mean days | se days | Median days | 0.95 LCL | 0.95 UCL |
|---|---|---|---|---|---|---|
| 1 | 9 | 500 | 119.9 | 427 | 382 | — |
| 2 | 20 | 423 | 74.3 | 368 | 211 | — |
| 3 | 20 | 375 | 133.1 | 138 | 105 | 262 |
| 4 | 9 | 214 | 89.5 | 49 | 27 | — |
| 5 | 26 | 624 | 180.1 | 167 | 143 | 436 |
| 6 | 5 | 452 | 157.3 | 457 | 93 | — |
| 7 | 26 | 342 | 44.6 | 293 | 249 | 509 |

Statistical tests:
log-rank: p-value = 0.1600;
Peto: p-value = 0.432.
Key:
se: standard error of the mean,
LCL and UCL: lower- and upper-confidence limits of the median respectively (in days),
n: number of counts.
Note that "—" denotes that the upper bound is undefined for the data provided.

TABLE III

CPH summary statistics for explanatory variable FieldID for
seven fields in the ESP System (117 records with two NAs).

| CPH | | Mean | se | Median | 0.95 | 0.95 |
|---|---|---|---|---|---|---|
| FieldID | n | days | days | days | LCL | UCL |
| 1 | 115 | 783 | 133.6 | 498 | 242 | — |
| 2 | 115 | 569 | 83.5 | 319 | 214 | 1775 |
| 3 | 115 | 264 | 23.5 | 161 | 98 | 318 |
| 4 | 115 | 229 | 18.2 | 154 | 50 | 466 |
| 5 | 115 | 466 | 61.3 | 260 | 166 | 546 |
| 6 | 115 | 494 | 67.3 | 264 | 149 | — |
| 7 | 115 | 511 | 70.8 | 293 | 211 | 649 |

Statistical tests:
LRT: p-value = 0.1950;
CPH = 0.818.
Key: refer to Table B.1.

In accordance with the method of the present invention, stage 1 exploratory data analysis (such as described above for FieldID) is repeated for each EV in the data set. The statistical threshold (p-values=0.05) is used to demarcate the significance of each EV. Any parameter falling below the critical p-value threshold indicates that this parameter is most likely to have a significant impact on performance. The higher a parameter is above this threshold, the less likely it is to have an impact on performance.

Figure 3:
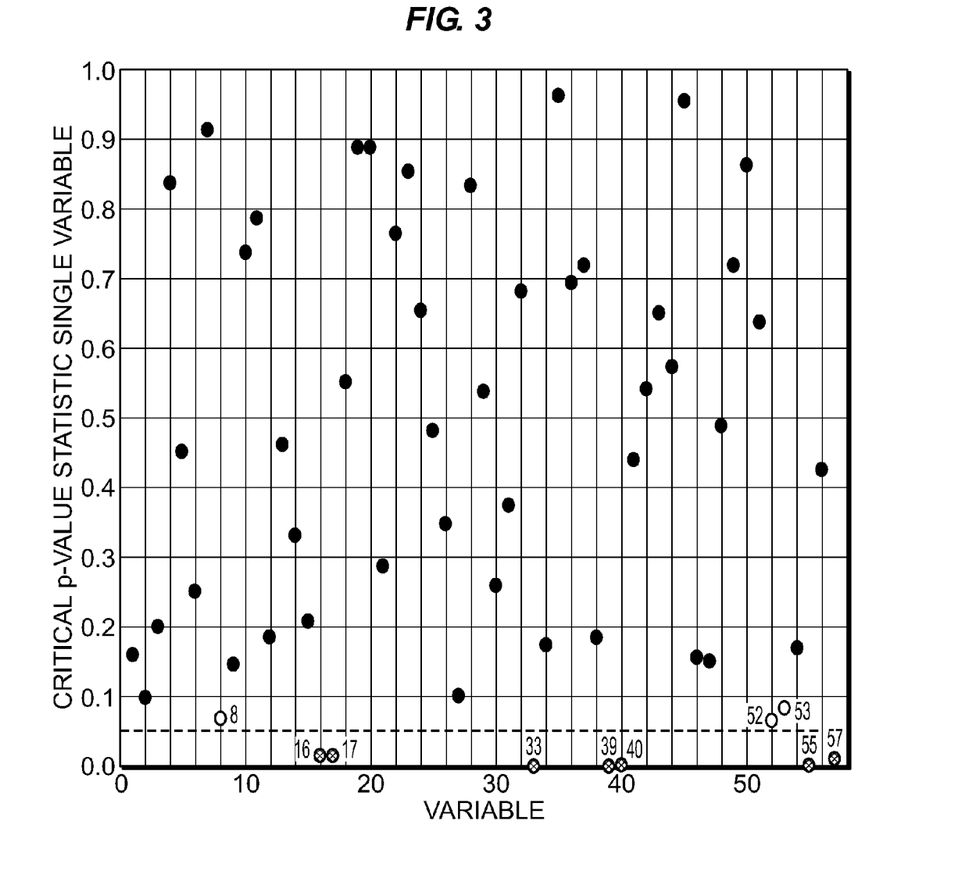
FIG. 3 is a graph that illustrates a summary of critical p-value statistics for all 57 primary Explanatory Variables in the test data set pertaining to the ESP System referenced with respect to FIG. 1 and where the index on the x-axis refers uniquely to each of the 57 EV's considered in the study.

FIG. 3 illustrates a plot of the p-value for each EV in the data set for the ESP system. Table IV below shows the seven primary EVs that were identified, namely those characterized by falling below the critical threshold p-value=0.05. An additional three EVs (with indexes 8, 52 and 53) with marginal statistical significance were also identified. While these do not show as much significance as those in the primary list, they may turn out to be significant when building models when involving more than one EV. Both the KM and CM approaches identified the same set of seven significant EVs.

TABLE IV

List of seven significant explanatory variables for single parameter
analysis (no collapsing) for both KM and CPH models (found at the
end of Stage 1. These were identified by (mostly) falling below the
critical threshold of p-value = 0.05. CPHA = Cox's Proportional
Hazards assumption test.

| | | KM Log-rank | CPH | |
|---|---|---|---|---|
| Index | Explanatory Variable | | LRT | CPHA |
| 16 | Panel Man | 0.0150 | 0.0188 | 0.8900 |
| 17 | Variable SD | 0.0150 | 0.0255 | 0.9830 |
| 33 | Motor Series | 0.0000 | 0.0008 | 0.3960 |
| 39 | Cable Man. | 0.0002 | 0.0022 | 0.0472 |
| 40 | Cable Type | 0.0025 | 0.0188 | 0.0305 |
| 55 | Cable Band | 0.0016 | 0.0037 | 0.0471 |
| 57 | Grounded | 0.0107 | 0.0120 | 0.0397 |

In accordance with the present invention, a stepwise model selection is now performed, which is an iterative procedure involving adding or deleting an EV at each stage. The choice to add or delete is made by considering all of the AIC values of models formed by single variable addition or deletion from the current model. Any models that have a lower AIC value than the current one are deemed to be better. For each iteration, the best model (i.e. the one with the lowest AIC) is chosen to be the current model for the next iteration. If there are no models that have a lower AIC than the current model, the procedure terminates.

Table V below demonstrates the stepwise procedure from the initial model that includes all seven significant EVs identified in Stage 1. The full output of the AIC analysis (not shown) provides information at each iteration regarding the AIC of all models formed by the deletion of an EV in the current model and by the addition of an EV not in the current model. The subsequent iterations in Table V have smaller AIC scores (indicating better models). In the above example, the current model at each step is formed by successive deletion of an EV and at no subsequent steps are these EVs ever returned into the current model. As noted above some EVs identified as significant in Stage 1 will not be deemed significant when combined with other such EVs. A reasonable model of data for Stage 2, as summarized in Table V has now been identified.

TABLE V

The stepwise modeling process using AIC. The initial model comprises
the seven significant EVs identified in Stage 1. AIC is used to identify
a parsimonious model that only includes three of these EVs.

| Step | Model Variables (per Table 1) | AIC |
|---|---|---|
| Initial | 16, 17, 33, 39, 40, 55, 57 | 685.98 |
| 1 | 16, 17, 33, 39, 55, 57 (removed #40) | 678.09 |
| 2 | 16, 17, 33, 55, 57 (removed #17) | 676.18 |
| 3 | 33, 39, 55, 57 (removed #16) | 674.75 |
| 4 | 33, 39, 55 (removed #57) | 673.44 |
| Final | 33 (=Motor Series) and 39 (=Cable Manufacturer) and 55 (=Cable Bands) | 673.44 |

The stepwise process of Stage 2 suggests that only the three EVs identified in Table V are required in a CPH model to adequately represent the data.

A method according to the present invention further includes the stage of factor collapsing, which may, for example, be implemented using an iterative process that at each stage identifies the "best" two levels to combine for any factor having three or more levels. Thus, at each iteration, every possible model formed by pair-wise combinations of the current factor levels are compared to the current model via a LRT. For each candidate model a non-significant p-value (greater than 0.05) indicates that there appears to be no significant difference between the two combined levels. The "best" of all candidate models is given by the least significant p-value: i.e., the one with the largest p-value above 0.05. The model that yields such value is then chosen for the current model in the next iteration. When no pair-wise combinations yield non-significant p-values, no further collapsing is possible because all remaining levels are significantly different and the algorithm terminates.

The fourth step in a method in accordance with the present invention comprises the stage of inclusion of interactions/other EVs. In this stage, consideration is given to model refinement by applying stepwise model selection using AIC from the current model. The range of models is bounded by the most complex that includes the current EVs, their pair-wise interactions and the excluded EVs, not just those identified in Stage 1. The inclusion of previously disqualified EVs allows the confirmation that they are indeed not necessary. The inclusion of pair-wise interaction parameters allows the capture of EV effects that are not behaving in an additive way. In other words, interactions allow an EV to have a different influence on survival over the different values provided by considering another EV.

Figure 4:
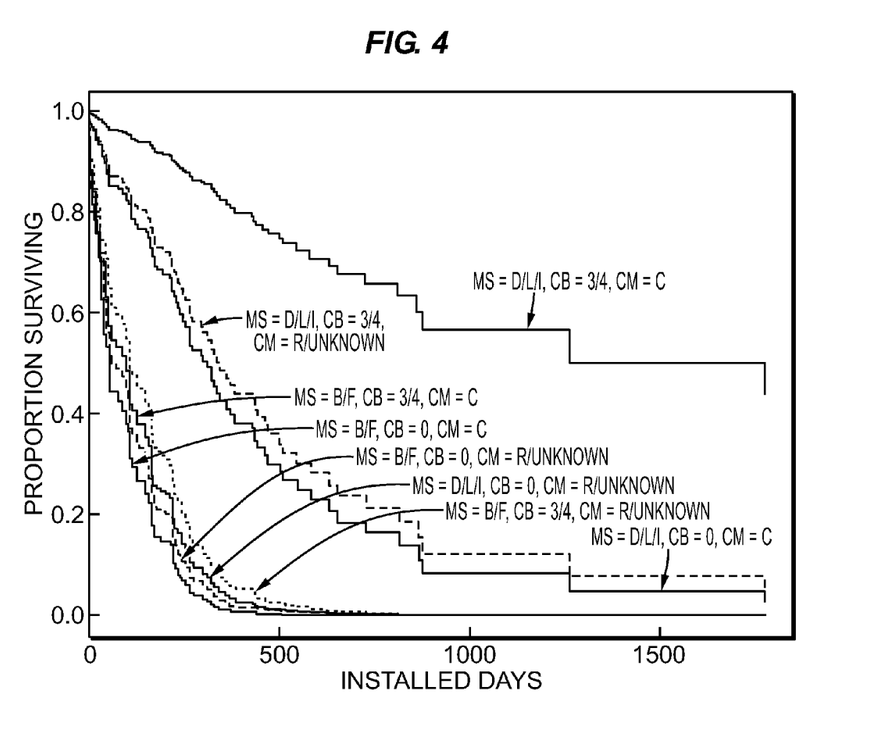
FIG. 4 is a graph that illustrates the final model of survival curves for each combination of the Explanatory Variables Motor Series (denoted as "motser" in the data set), Cable Bands (denoted as "cblbds" in the data set) and Cable Manufacturer (denoted as "cabmanf" in the data set) for the test data set pertaining to the ESP System referenced with respect to FIG. 1.
Figure 5:
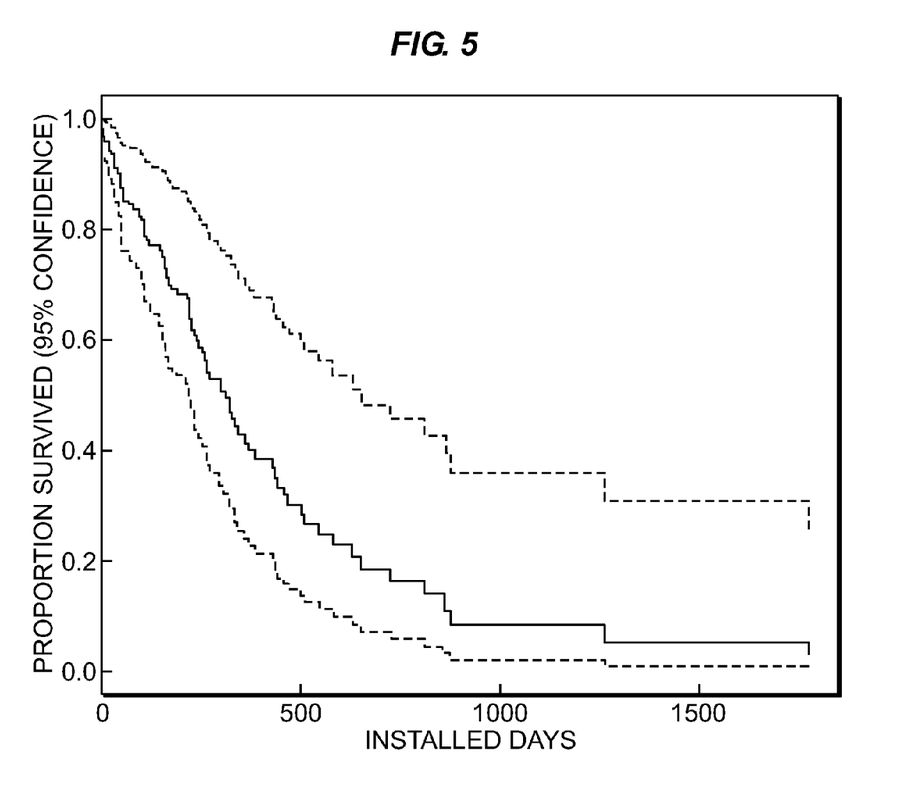
FIG. 5 is a graph that illustrates the Final model of FIG. 4 for Motor Series "D/L/T", Cable Manufacturer "C" and Cable Bands "0" with 95% confidence interval (bounds) incorporated either side of the expected survival curve.

The fifth step of a process according to the present invention is Model Checking where the proportional hazard assumption of the final model is tested. A global test is employed to see, if overall, the model violates this assumption. If it does, then proportional hazard assumption tests for individual EVs can suggest which of them violate the assumption. Any such variable needs to be declared as a strata variable in a stratified CPH model. Here separate baseline functions are fit for the levels of each violating EV. FIG. 4 illustrates the final model of survival curves for each combination of EVs Motor Series, Cable Bands and Cable Manufacturer for the test data set pertaining to the ESP system referenced in FIG. 1 while FIG. 5 illustrates the final model of FIG. 4 for the specific Motor Series "D/L/I", Cable Manufacturer "C" and Cable Bands "0", with 95% confidence interval (bounds) incorporated either side of the expected survival curve.

III. DESCRIPTION OF A METHOD OF SURVIVAL ANALYSIS FOR COMPONENTS OF OILFIELD EQUIPMENT

A method according to the present invention may also be utilized to apply survival analysis to any oilfield equipment components where time-to-event information has been recorded. The method of the present invention allows comparative reckoning between different components present in the system comprising several, or many, individual components, and allows analysis of these components either individually or simultaneously (in the presence of other components).

A method of performing a survival analysis on the components of an item of equipment comprises the step of representing the data on said components in a counting process formulation of a Cox model. In one embodiment, the i-th component may be represented by a set of observations: $s_{ij}, t_{ij}, \delta_{ij}, x_{ij}, k_i, j=1, \ldots n_i$, where $(s_{ij}, t_{ij}]$ is an interval of risk, open on the left and closed on the right, $\delta_{ij}=0$ if the component has failed at time t, and 1 if the component has not failed. $x_{ij}$ is the explanatory variable vector over the interval and $k_i$ is the component type stratum variable. In the present method we will thus produce multiple observations of each component in an installation, and multiple observations of individual components across installations. In the data used in the above-described system survival analysis:

$s_{ij}$=daystart
$t_{ij}$=dayend
$\delta_{ij}$=eqstatus
$k_i$=comppart
$x_{ij}$=remaining explanatory variables.

With the method of the present invention, it is not necessary to have contiguous observations. Observations that are not contiguous may, for example, occur when considering a data set specific to a geographic region and a temporary component is utilized in an installation otherwise outside its valid operation range before returning to an installation within its normal operating region.

A method according to the present invention next comprises the step of applying an extension of the Cox Proportional Hazard model to the data, and as noted above, in one embodiment the extension that is applied is the Lunn extension. The Lunn extention is utilized because a key assumption in the CPH model is that observed survival or event times are independent. However, when dealing with component data, observations involving components in the same installation are naturally related and multiple observations of an individual component through its reuse are also clearly related.

A method according to the present invention next comprises the step of performing individual survival analysis on each of the identified components by using the five-stage method described above. The final step of a method according to the present invention is to establish the time-to-event estimate for each of the recorded components either taken individually or in the presence of the other components such that an estimate of competing risks is obtained.

Table VI below illustrates the results of applying the method of the present invention to data obtained with respect to ESPs. Section A of Table VI illustrates a model for system well failure. Section B of Table VI illustrates a model for component failure not considered individually but treated as a system well failure. Sections C-F of Table VI, illustrate time-to-failure estimates for the protector, motor, intake and pump, respectively, of the ESP, but performed individually. Section G of Table F illustrates analysis of the components in the presence of one another which provides a competing-risks estimate.

TABLE VI

| Variable | Coef | se(coef) | z | p | Hazards Ratio | 95% Conf. Int. Lower | 95% Conf. Int. Upper | |
|---|---|---|---|---|---|---|---|---|
| Model for All Components | | | | | | | | |
| PuMoPr.abrasionTRUE | 2.14 | 0.397 | 6.62 | 3.5e−11 | 8.510 | 4.516 | 16.039 | G |
| chkvalveTRUE | 1.59 | 0.338 | 4.79 | 1.7e−06 | 4.923 | 2.563 | 9.456 | |
| PuInMo.cntrlizrTRUE | −1.53 | 0.382 | −3.84 | 1.2e−04 | 0.216 | 0.099 | 0.473 | |
| PuMo.npull | 1.28 | 0.269 | 5.28 | 1.3e−07 | 3.593 | 2.235 | 5.777 | |
| PuMoPr.panelmfgREDA | −1.85 | 0.274 | −7.20 | 6.2e−13 | 0.157 | 0.095 | 0.260 | |
| Pr.scaleTRUE | −2.40 | 1.050 | −2.25 | 2.4e−02 | 0.091 | 0.011 | 0.735 | |
| Model for Pump | | | | | | | | |
| abrasionTRUE | 1.58 | 0.648 | 2.78 | 5.4e−03 | 4.833 | 1.593 | 14.669 | F |
| cntrlizrTRUE | −1.09 | 0.545 | −2.13 | 3.3e−02 | 0.335 | 0.122 | 0.916 | |
| mtcVOLTRON-113 | 1.27 | 0.461 | 3.02 | 2.5e−03 | 3.562 | 1.563 | 8.118 | |
| npull | 1.48 | 0.386 | 4.07 | 4.7e−05 | 4.383 | 2.151 | 8.928 | |
| panelmfgUnknown | 1.43 | 0.424 | 3.40 | 6.8e−04 | 4.175 | 1.831 | 9.521 | |
| Model for Intake/GS | | | | | | | | |
| chkvalveTRUE | 1.96 | 0.632 | 3.25 | 1.1e−03 | 7.131 | 2.183 | 23.294 | E |
| cntrlizrTRUE | −2.32 | 1.069 | −2.28 | 2.3e−02 | 0.098 | 0.013 | 0.722 | |
| Model for Motor | | | | | | | | |

TABLE VI-continued

| Variable | Coef | se(coef) | z | p | Hazards Ratio | 95% Conf. Int. Lower | 95% Conf. Int. Upper | |
|---|---|---|---|---|---|---|---|---|
| abrasionTRUE | 2.357 | 0.692 | 4.06 | 4.9e−05 | 10.554 | 3.384 | 32.915 | D |
| npull | 0.878 | 0.396 | 2.41 | 1.6e−02 | 2.406 | 1.178 | 4.913 | |
| panelmfgREDA | −1.901 | 0.443 | −4.26 | 2.1e−05 | 0.149 | 0.062 | 0.359 | |
| Model for Protector | | | | | | | | |
| abrasionTRUE | 2.83 | 0.719 | 4.70 | 2.7e−06 | 17.008 | 5.212 | 55.505 | C |
| panelmfgREDA | −1.58 | 0.561 | −3.03 | 2.5e−03 | 0.205 | 0.074 | 0.572 | |
| scaleTRUE | −2.12 | 1.044 | −2.05 | 4.0e−02 | 0.119 | 0.016 | 0.912 | |
| Model for system: component failure | | | | | | | | |
| scaleTRUE | −5.500 | 2.025 | −2.72 | 6.6e−03 | 0.004 | 0.000 | 0.216 | B |
| mtcVOLTRON-113 | 1.901 | 0.461 | 4.12 | 3.7e−05 | 6.694 | 2.714 | 16.526 | |
| cntrlizrTRUE | −1.323 | 0.608 | −2.18 | 2.9e−02 | 0.266 | 0.081 | 0.877 | |
| panelmfgREDA | −1.315 | 0.372 | −3.53 | 4.1e−04 | 0.268 | 0.129 | 0.557 | |
| motnumb | 0.319 | 0.389 | 0.82 | 4.1e−01 | 1.376 | 0.642 | 2.946 | |
| scaleTRUE:motnumb | 2.464 | 0.968 | 2.55 | 1.1e−02 | 11.754 | 1.764 | 78.370 | |
| Model for system: well failure | | | | | | | | |
| cablemanufUnknown | Strata | — | — | — | — | — | — | A |
| corosion | Strata | — | — | — | — | — | — | |
| fieldid | −1.071 | 0.343 | −4.81 | 1.5e−06 | 0.343 | 0.222 | 0.530 | |
| wellevtno | −0.117 | 0.890 | −2.05 | 4.0e−02 | 0.890 | 0.796 | 0.995 | |
| cblbands4 | 0.531 | 1.701 | 2.12 | 3.4e−02 | 1.701 | 1.040 | 2.783 | |
| wellmotorCL-562+ | −1.970 | 0.139 | −4.36 | 1.3e−05 | 0.139 | 0.058 | 0.338 | |
| WellmotorOthers | −1.422 | 0.241 | −2.81 | 5.0e−03 | 0.241 | 0.089 | 0.651 | |

What is claimed is:

1. A method for predicting time-to-occurrence of different types of events in an oilfield equipment system that comprises components in different component categories, the method comprising:

providing a group of Explanatory Variables that comprises factor type Explanatory Variables and covariate type Explanatory Variables wherein the covariate type Explanatory Variables comprise numeric Explanatory Variables for each of the different component categories that specify a number of components in a respective one of the different component categories;

identifying significant multi-level factor type Explanatory Variables with respect to the oilfield equipment system by performing an individual statistical analysis on each multi-level factor type Explanatory Variable of the group of Explanatory Variables to provide respective p-values and comparing each of the respective p-values to a selected critical p-value as a statistical threshold to demarcate a statistically analyzed multi-level factor type Explanatory Variable as significant with respect to performance of the oilfield equipment system;

generating a model using the identified significant multi-level factor type Explanatory Variables and at least one of the covariate type Explanatory Variables using two or more numeric Explanatory Variables for different component categories wherein the different types of events comprises an event associated with one of the different component categories or with two or more of the different component categories; and interpreting the model to obtain an estimate of time-to-occurrence of one or more of the different types of events.

2. The method of claim 1, wherein generating a model further comprises using stepwise model selection.

3. The method of claim 1, wherein generating a model further comprises using factor collapsing to reduce a number of levels in one or more of the multi-level factor type Explanatory Variables.

4. The method of claim 1, further comprising excluding at least some of the Explanatory Variables of the group of Explanatory Variables and wherein generating a model further comprises: including interactions between pairs of the identified significant Explanatory Variables and including one or more of the excluded Explanatory Variables.

5. The method of claim 1, wherein generating a model comprises checking the model.

6. A method of producing a risks model for components in different component categories of an oilfield equipment system for which data on the components has been obtained, comprising:

a) providing a group of Explanatory Variables that comprises factor type Explanatory Variables and covariate type Explanatory Variables wherein the covariate type Explanatory Variables comprise numeric Explanatory Variables for each of the different component categories that specify a number of components in a respective one of the different component categories;

b) representing the data with respect to the Explanatory Variables in a counting process formulation of a Cox Proportional Hazards model;

c) applying a Lunn Extension to the data of step b) to extend the data;

d) performing Cox Proportional Hazards model regression on the extended data;

e) based on the Cox Proportional Hazards model regression, determining respective p-values and Cox Proportional Hazard Assumption test values for the Explanatory Variables;

f) identifying significant Explanatory Variables based at least in part on comparing each of the respective p-values to a selected critical p-value as a statistical threshold; and g) producing the risks model based at least in part on the identified significant Explanatory Variables using two or more numeric Explanatory Variables for different component categories.

7. The method of claim 6, wherein the oilfield equipment system comprises electrical submersible pumps and wherein the different component categories comprise a pump category, an intake category, a motor category and a protector category.

8. A method of producing time-to-event models for components in different component categories of an oilfield equipment system for which data on the components has been obtained, comprising:
   a) providing a group of Explanatory Variables that comprises factor type Explanatory Variables and covariate type Explanatory Variables wherein the covariate type Explanatory Variables comprise numeric Explanatory Variables for each of the different component categories that specify a number of components in a respective one of the different component categories;
   b) representing the data with respect to the Explanatory Variables in a counting process formulation of a Cox Proportional Hazards model;
   c) applying a Lunn Extension to the data of step b) to extend the data;
   d) performing Cox Proportional Hazards model regression on the extended data;
   e) based on the Cox Proportional Hazards model regression, determining respective p-values and Cox Proportional Hazard Assumption test values for the Explanatory Variables;
   f) identifying significant Explanatory Variables based at least in part on comparing each of the respective p-values to a selected critical p-value as a statistical threshold; and
   g) producing the time-to-event models for the components based at least in part on the identified significant Explanatory Variables using two or more numeric Explanatory Variables for different component categories wherein the time-to-events models comprise events associated with one of the different component categories or with two or more of the different component.

9. The method of claim 8, wherein an event of a time-to-event model relates to electrical submersible pumps and wherein the different component categories comprise a pump category, an intake category, a motor category and a protector category.

10. The method of claim 9, wherein the event is a failure of one or more components in one or more of the different component categories.

11. The method of claim 2, wherein the using stepwise model selection comprises using Akaike Information Criteria.

12. The method of claim 3, wherein using factor collapsing comprises using a backward elimination process using likelihood ratio tests.

13. The method of claim 6 further comprising applying a censoring flag to the data obtained for at least one of the components that has not failed.

14. The method of claim 6 further comprising checking for and discarding any of the Explanatory Variables that do not contain contrasting information.

* * * * *